(12) United States Patent
Cachod et al.

(10) Patent No.: US 7,185,895 B2
(45) Date of Patent: Mar. 6, 2007

(54) CHUCK WITH LOCKING SYSTEM

(75) Inventors: Yves Marie Marcel Cachod, Levier (FR); Gerard Marie Simonin, Monflovin (FR)

(73) Assignee: Etablissements Amyot, S.A., Pontarlier (FR)

( * ) Notice: Subject to any disclaimer, the term of this patent is extended or adjusted under 35 U.S.C. 154(b) by 186 days.

(21) Appl. No.: 10/694,796

(22) Filed: Oct. 29, 2003

(65) Prior Publication Data

US 2004/0135325 A1    Jul. 15, 2004

(30) Foreign Application Priority Data

Nov. 18, 2002   (FR) ................... 02 14394

(51) Int. Cl.
   *B23B 31/12*   (2006.01)

(52) U.S. Cl. ......................................... 279/62; 279/140

(58) Field of Classification Search ................. 279/60, 279/61, 62, 902, 140; *B23B 31/16*
See application file for complete search history.

(56) References Cited

U.S. PATENT DOCUMENTS

| | | | |
|---|---|---|---|
| 5,741,016 A | | 4/1998 | Barton et al. |
| 5,765,839 A | * | 6/1998 | Rohm .......................... 279/62 |
| 5,957,469 A | * | 9/1999 | Miles et al. ................... 279/62 |
| 6,257,596 B1 | * | 7/2001 | Yang ............................ 279/62 |
| 6,341,783 B1 | * | 1/2002 | Rohm .......................... 279/62 |
| 6,390,481 B1 | * | 5/2002 | Nakamuro .................... 279/62 |
| 6,517,088 B1 | * | 2/2003 | Rohm .......................... 279/62 |
| 6,581,942 B2 | * | 6/2003 | Rohm .......................... 279/62 |
| 2003/0071425 A1 | * | 4/2003 | Lin .............................. 279/62 |
| 2004/0032095 A1 | * | 2/2004 | Rohm .......................... 279/62 |
| 2004/0217558 A1 | * | 11/2004 | Yang et al. ................... 279/62 |
| 2005/0023774 A1 | * | 2/2005 | Mack .......................... 279/60 |

FOREIGN PATENT DOCUMENTS

EP    1 055 472 A1    11/2000

* cited by examiner

*Primary Examiner*—Monica Carter
*Assistant Examiner*—J Williams
(74) *Attorney, Agent, or Firm*—Oliff & Berridge, PLC

(57) ABSTRACT

This is a chuck for equipping a rotary machine, comprising a body intended to be fixed to a drive shaft of the machine, in which there are mounted several jaws which slide in bores converging forward and which each have an outwardly facing threaded part, a sleeve being pivotably mounted on the body and having an interior wall which collaborates with a nut itself engaged with the threaded exterior part of the jaws. The body comprises, in its region covered by the nut, a peripheral set of teeth and the nut bears locking means which are intended to engage in the set of teeth of the body when the chuck is in the tightened position, and which are intended to be activated by the sleeve. The sleeve has an angular relative movement with respect to the locking means between an unlocked position in which the sleeve turns the nut and a locked position in which the chuck is in its tightened position.

20 Claims, 4 Drawing Sheets

CHUCK WITH LOCKING SYSTEM

BACKGROUND OF THE INVENTION

The subject of the present invention is a chuck to equip a rotary machine.

More specifically, the present invention relates to a chuck intended to equip a drill.

Chucks generally encountered comprise a body intended to be fixed to a drive shaft of the machine, in which there are mounted several jaws which slide in bores converging forward and which each have an outwardly facing threaded part, a sleeve being pivotably mounted on the body and having an interior wall which collaborates with a nut itself engaged with the threaded exterior part of the jaws.

DESCRIPTION OF THE PRIOR ART

An example of such a chuck is described in particular in document EP-618 029 in the name of the Applicant Company.

Chucks of the aforesaid type have the advantage of allowing a tool to be clamped without the need to use a key, while at the same time avoiding unwanted opening of the chuck during, in particular, hammer-drilling. Even though these chucks are entirely satisfactory as far as their operation is concerned, they do have the disadvantage of containing a great many constituent parts. They are therefore of high cost and require several assembly operations.

SUMMARY OF THE INVENTION

It is a particular object of the present invention to overcome the aforesaid disadvantages by providing a chuck in which the number of constituent parts is lower in order to simplify the assembly of this chuck.

To this end, according to embodiments of the invention, the chuck of the aforesaid type is essentially one wherein the body comprises, in its region covered by the nut, a peripheral set of teeth and the nut bears a locking mechanism which is intended to engage in the set of teeth of the body when the chuck is in the tightened position, and which are intended to be activated by the sleeve, and wherein the sleeve has an angular relative movement with respect to the locking mechanism between an unlocked position in which the sleeve turns the nut and a locked position in which the chuck is in its tightened position.

Thus, by virtue of these measures, the chuck has a locking mechanism that is mounted directly on the nut and is operated by the sleeve itself manipulated directly by the operator.

Advantageously, the locking mechanism comprises at least one first spring leaf which is mounted angularly fixedly on the nut and which has a free end projecting through an opening made in the nut so that when the chuck is in the tightened position it reaches the set of teeth of the body.

In a preferred embodiment, the locking mechanism comprises at least one second spring leaf which has a free end equipped with a relief which collaborates, in the unlocked and locked positions of the sleeve respectively, with a first depression and with a second depression which are formed in this sleeve.

Still as a preference, the first and second spring leaves are secured to a ring borne by the nut and prevented from rotating on this nut by means of at least two tabs which enter complementary parts formed in the nut.

As a preference, the sleeve comprises at least one hollowed-out part in which the free end of the first spring leaf is housed, when the sleeve is in the unlocked position, so as to disengage this free end from the set of teeth of the body.

Still as a preference, the sleeve comprises at least two fingers which collaborate with at least two notches formed on the nut, the notches being centered on the axis of the chuck and being longer than the fingers of the sleeve, this length being considered in the direction of the circular arc over which these notches extend.

Advantageously, the difference in length between the notches of the nut and the fingers of the sleeve is tailored so that when the sleeve is in the unlocked position, the fingers are in abutment against one of the faces of the notches and the relief of the second spring leaf is in the first depression, and so that when the sleeve is in the locked position the fingers are in abutment against the other of the faces of the notches and the relief of the second spring leaf is in the second depression.

As an alternative, the tabs of the ring extend radially and the complementary parts formed in the nut comprise at least two notches.

In another alternative form, the tabs of the ring each comprise a base extending transversely with respect to the plane of the ring and two bends which extend from the base and more or less toward the outside of the ring, the bases and the bends nesting elastically in the notches of the nut into which notches the fingers of the sleeve penetrate.

BRIEF DESCRIPTION OF THE DRAWINGS

Other features and advantages of the invention will become more clearly apparent with the aid of the description which follows, with reference to the appended drawings which, by way of nonlimiting examples, depict two of its embodiments.

DESCRIPTION OF THE PREFERRED EMBODIMENTS

Figure 1:
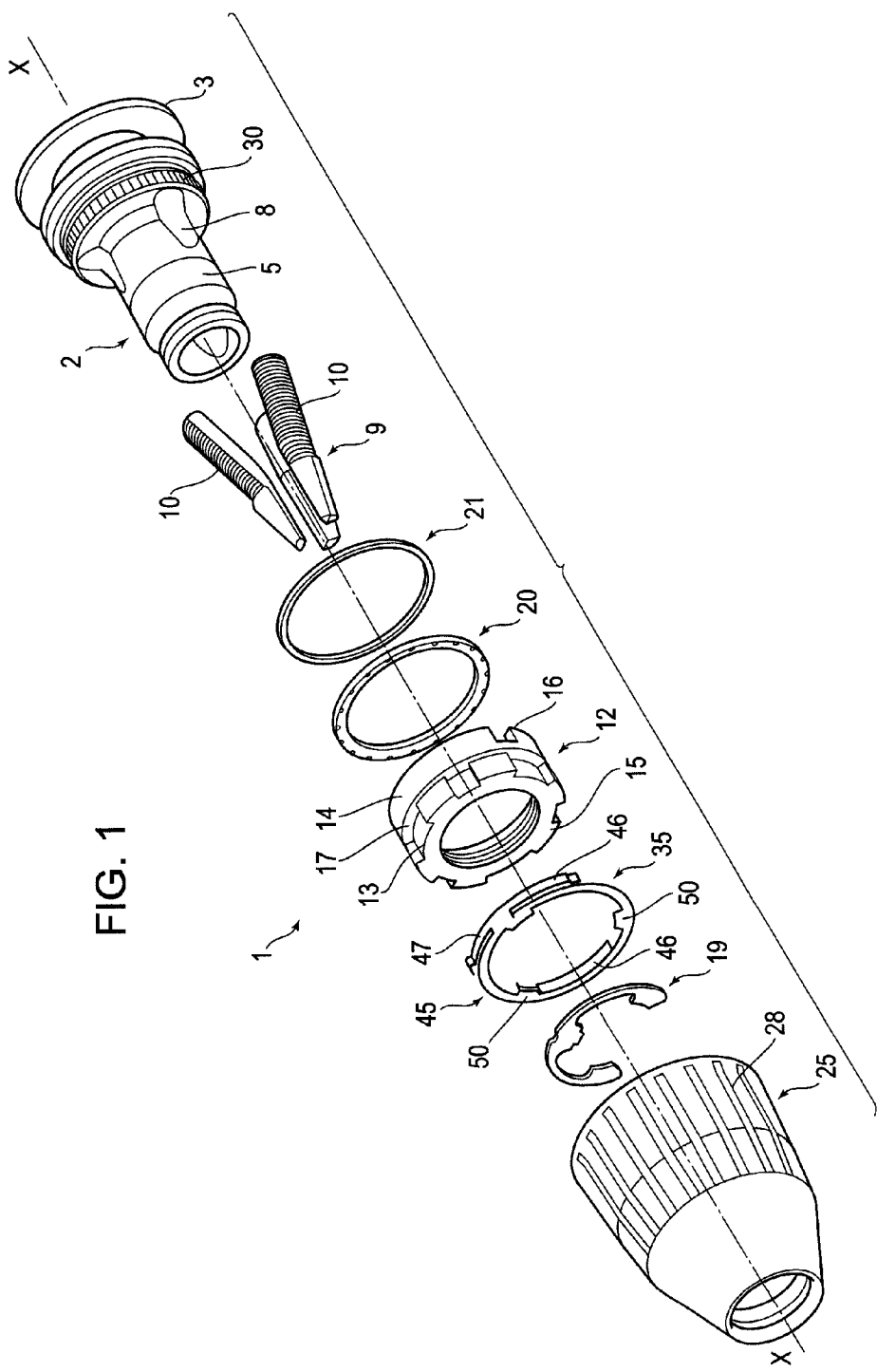
FIG. 1 is an exploded perspective view of a first embodiment of a chuck according to the present invention.

The chuck 1 depicted in the figures comprises a body 2 of cylindrical overall shape having a posterial wall 3 into which there opens a tapped hole 4 which is intended to allow the chuck to be secured to a threaded shaft of a rotary machine (not depicted in the figures).

The body 2 is symmetric about a longitudinal axis X—X and extends between the posterior wall 3 and a front part 5 in which there is also formed a cylindrical hole in which a tool such as a drill bit is to be received.

Formed in the body 2 are three bores 8 of axis Y—Y which forms an acute angle with respect to the longitudinal axis X—X of the body 2. These bores each serve to guide a jaw 9 and converge toward the front part 5 of the body 2, so that the forward movement of the jaws results in the jaws moving closer together to allow a tool (not depicted) to be clamped.

Furthermore, the exterior part of the jaws 9 has, in a way known per se, a screw thread 10 which collaborates with a tapped nut 12 to cause the jaws to move in one direction or the other in the bores 8, depending on the direction in which the nut 12 is turned.

The nut 12 is formed of a front cylindrical portion 13 and of a rear cylindrical portion 14 which are both of the same inside diameter, the outside diameter of the rear portion 14 being greater than the outside diameter of the front portion 13. The nut 12 also has a front face 15 and a rear face 16 both belonging to a plane roughly transversal to the axis X—X of the body 2. The meeting point of the front 13 and rear 14 portions defines a surface 17 parallel to the front 15 and rear 16 faces.

Figure 2:
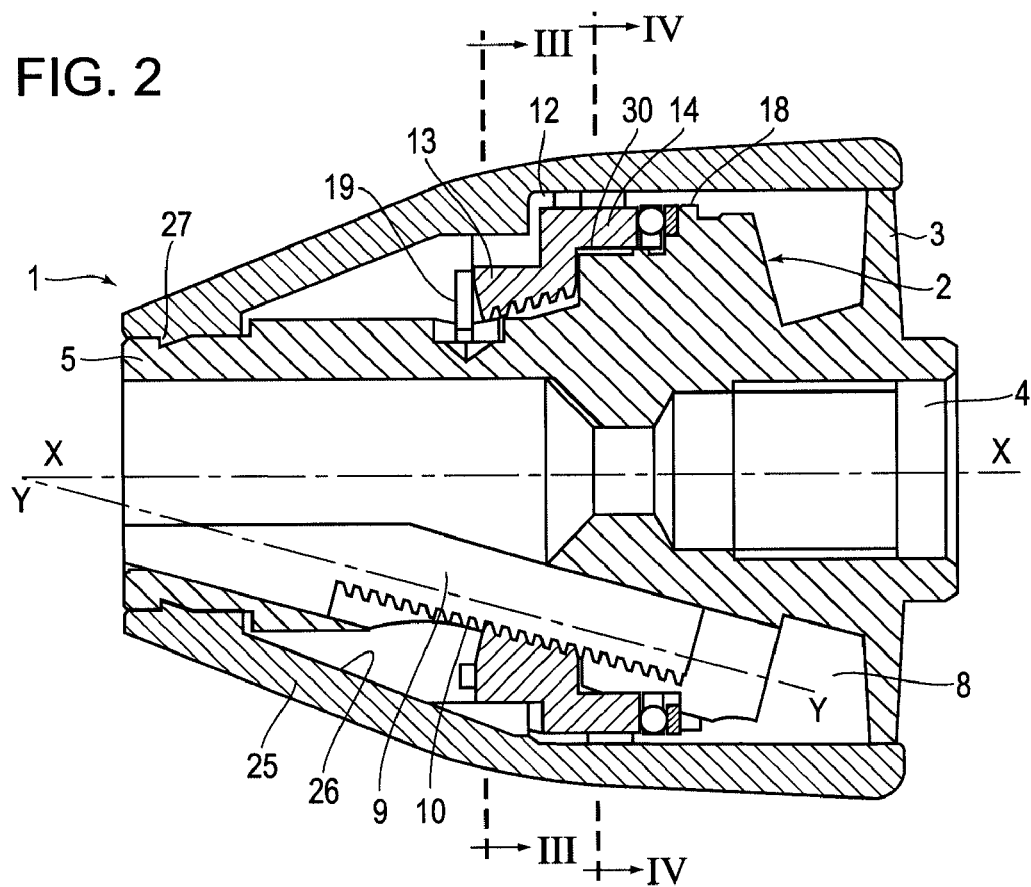
FIG. 2 is a view in longitudinal section of the chuck of FIG. 1.

As shown more particularly in FIG. 2, the body 2 has a flange 18 against which the nut 12 comes into abutment at the rear along its rear face 16. This nut 12 is axially immobilized forward by a circlip 19. To make it easier for the nut 12 to rotate on the body 2, a washer 20 and a ring fitted with ball bearing balls 21 are interposed between the rear face 16 of the nut 12 and the flange 18.

The chuck 1 also has a sleeve 25 produced, for example, in synthetic material and mounted to pivot in rotation on the body 2 about the axis X—X. This sleeve 25 has an interior wall 26 which collaborates with the nut 12 to turn this nut. The sleeve 25 extends roughly along the entire length of the body 2 between the posterior wall 3 and the front part 5. This sleeve is axially immobilized on the body 2 by means of a clip fitting 27, situated in the front part. To make it easier for an operator to manipulate, the sleeve 25 externally has knurling 28.

According to one feature of the invention, the body 2 comprises, in the region covered by the nut 12, a peripheral set of teeth 30 which extends toward the outside of the chuck and parallel to the axis X—X of the body 2.

According to another essential feature of the present invention, the nut 12 bears locking mechanism 35 which is intended to be engaged in the set of teeth 30 of the body 2 when the chuck is in the tightened position, and which is intended to be actuated by the sleeve 25. This sleeve has an angular relative movement with respect to the locking mechanism 35 between a first position or unlocked position (FIGS. 3 and 4) in which the sleeve 25 turns the nut 12 and a second position or locked position (FIGS. 5 and 6) in which the chuck is in its tightened position.

Figure 3:
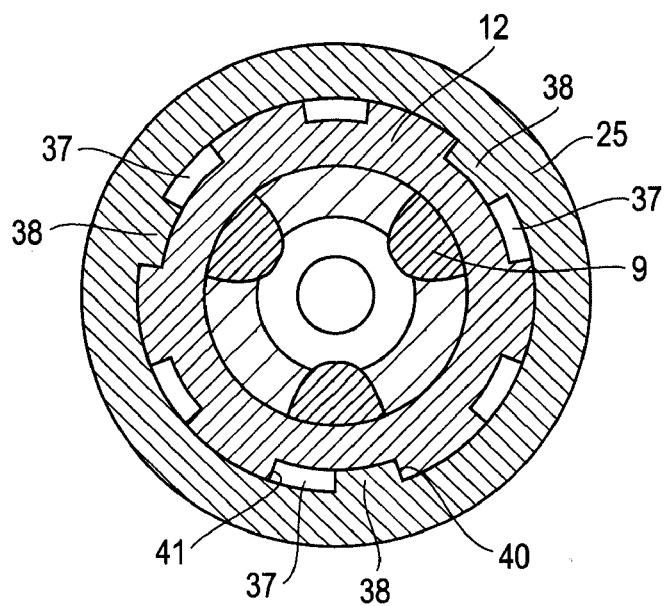
FIGS. 3 and 4 are views in cross section on III—III and IV—IV of FIG. 2, respectively, the chuck being in the unlocked position.
Figure 5:
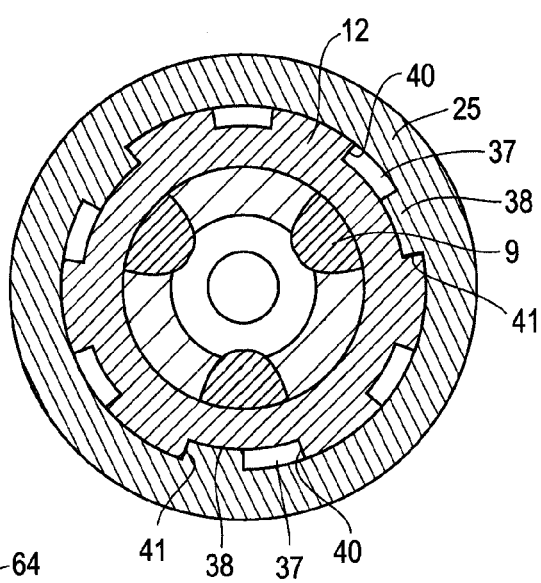
FIGS. 5 and 6 are views similar to those of FIGS. 3 and 4, the chuck being in the locked position.

As shown more particularly in FIGS. 3 and 5, the nut 12 preferably has three notches 37 distributed at uniform angles and which open toward the outside of the nut while at the same time being centered on the axis X—X of the chuck.

The interior wall 26 of the sleeve 25 preferably has three fingers 38 projecting toward the inside of the chuck. The notches 37 formed in the nut 12 are longer than the fingers 38 of the sleeve 25, the length being considered in the direction of the circular arc along which the notches 37 extend. These notches 37 are laterally delimited by two faces 40 and 41 directed more or less radially.

The relative angular movement of the sleeve 25 is thus limited by the fingers 38 coming into abutment against the radial face 40 of the notches 37, in the unlocked position (FIG. 3), and against the opposite radial face 41 of the notches 37 when the sleeve is in the locked position (FIG. 5).

The locking mechanism 35 comprises a ring 45 from which extends a first spring leaf 46 and a second spring leaf 47. The ring 45 is mounted so that it rotates as one with the nut 12 and is fixed to the latter by means of three tabs 50 which enter complementary parts formed in the nut 12. As a preference, the ring 45 is pressed against the surface 17 of the nut 12.

In the first embodiment, the three tabs 50 extend radially toward the inside of the ring 45 and the complementary parts formed in the nut 12 comprise the three notches 37 into which the fingers 38 of the sleeve 25 also penetrate. Of course, as an alternative, the three tabs 50 could be housed in notches separate from the notches 37.

Figure 4:
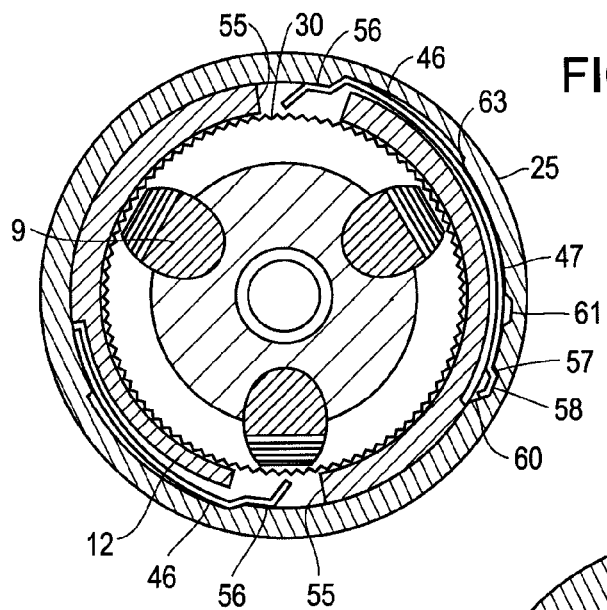
Figure 6:
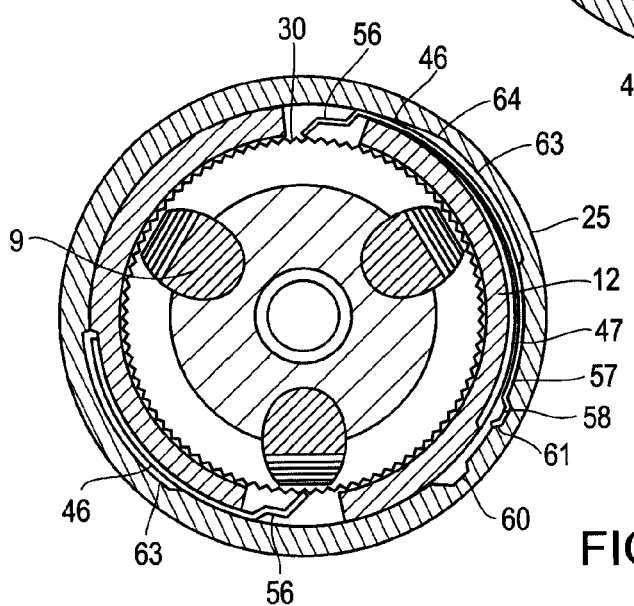

As shown more particularly in FIGS. 4 and 6, the first spring leaf 46 and the second spring leaf 47 extend away from one another, above the rear part 14 of the nut 12, being situated on a circular arc centered on the axis X—X. The first spring leaf 46 has a free end 56 which is curved toward the center of the chuck, projecting through a transverse recess 55 formed in the nut 12 in order, when the chuck 1 is in the tightened position, to reach the set of teeth 30 of the body 2.

The second spring leaf 47 has a second end 57 which has a relief 58 facing toward the outside of the chuck to collaborate, when the sleeve 25 is in the locked and unlocked position respectively, with a first depression 60 and with a second depression 61 which are formed in the interior wall 26 of the sleeve 25.

Furthermore, the sleeve 25 comprises, in its interior wall 26, a hollowed-out part 63 ending in a ramp 64 and in which the free end 56 of the first spring leaf 46 is housed, when the sleeve 25 is in the unlocked position, so as to disengage the free end 56 from the set of teeth 30 of the body 2, as is depicted in FIG. 4.

It will also be understood that the difference in length between the notches 37 of the nut 12 and the fingers 38 of the sleeve 25 is tailored so that when the sleeve is in the unlocked position, as depicted in FIGS. 3 and 4, the fingers 38 are in abutment against the radial face 40 of the notches 37 while the relief 58 of the second spring leaf 47 is housed in the first depression 60, whereas when the sleeve 25 is in the locked position as depicted in FIGS. 5 and 6, the fingers 38 of the sleeve are in abutment in the other radial face 41 of the notches 37 while the relief 58 of the second spring leaf 57 is housed in the second depression 61 of the sleeves 25.

As a preference, as is depicted in FIG. 1, the ring 45 also has another spring leaf identical to the first spring leaf 46 and situated diametrically opposite this spring leaf 46. Thus, the presence of two spring leaves 46 offset by 180° makes it possible to be sure that at least one of the free ends of these leaves will collaborate with the set of teeth 30 of the nut, without the risk of facing an interruption of the set of teeth that is due to the bores for the jaws.

It will thus be understood that, in the unlocked position, as depicted in FIGS. 3 and 4, the sleeve 25 turns the nut 12. In this configuration, the free end 56 does not collaborate with the set of teeth 30 of the body 2 which means that the jaws 9 are turned freely under the action of the sleeve 25.

By contrast, when the chuck is in the tightened position, that is to say when the jaws are in contact with the tool inserted into the chuck, the resistance of the nut 12 to being turned by the sleeve 25 increases. The sleeve 25 then turns with respect to the assembly consisting of the nut 12 and of the spring leaves 46 and 47. This relative rotation is limited by the difference in length between the fingers 38 of the sleeve 25 and the notches 37 of the nut 12. The fingers 38 then come into abutment against the radial faces 41 of the notches 37 while the relief 58, borne by the second spring leaf 47, is disengaged, through a bending effect, from the first depression 60 to become lodged in the second depression 61. At the same time, the free ends 56 of the first spring leaves 46 are deflected toward the inside of the chuck so that these free ends collaborate with the set of teeth 30 borne by the body 2. The tightening of the chuck can then continue as far as the maximum torque that the operator can apply with a ratcheting effect of the spring leaves 46 on the set of teeth 30 of the body 2 which is audible to the operator. Collaboration between the free ends 56 and the set of teeth 30 prevent any unwanted unlocking by the vibrations caused during hammer-drilling.

When there is a desire to remove the tool from the chuck again, all that is required is for the sleeve 25 to be turned from its locked position to its unlocked position. The sleeve 25 is then turned in the opposite direction to the previous direction, thus causing the relief 58 to move toward the first depression 60 and the free ends 56 of the first spring leaves 46 to disengage from the set of teeth 30. The fingers 38 of the sleeve 25 once again come into abutment against the free radial face 40 of the notches 37 borne by the nut 12. Any additional rotation of the sleeve 25 turns the nut 12 and therefore loosens the jaws.

Figure 7:
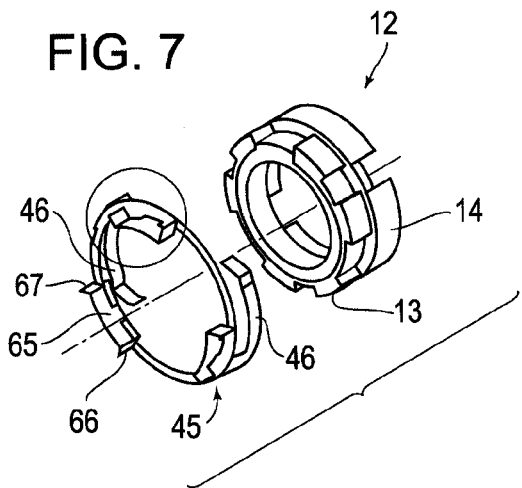
FIG. 7 is a perspective view of the locking mechanism according to a second embodiment of the present invention, ready to be mounted on the nut.
Figure 8:
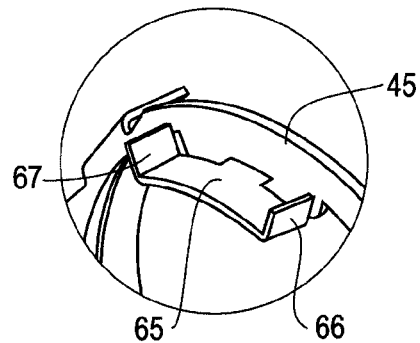
FIG. 8 is an enlarged part view of the locking mechanism of FIG. 7.
Figure 9:
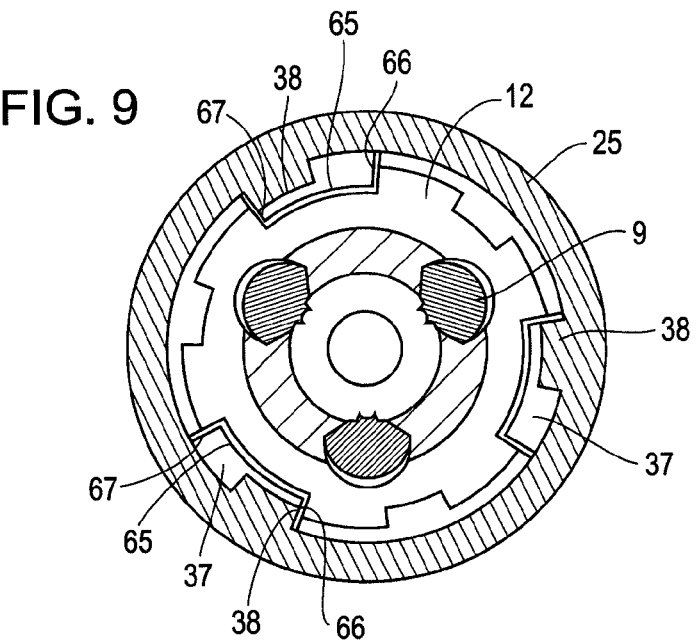
FIG. 9 is a view similar to that of FIG. 3, of a chuck equipped with the locking mechanism depicted in FIGS. 7 and 8.

The second embodiment depicted in FIGS. 7 to 9 differs from the first embodiment solely in the shape of the tabs 50 that immobilize the ring 45 on the nut 12. The tabs 50 now have a base 65 which extends roughly transversely with respect to the plane of the ring 45, and two bends 66 and 67 which extend from the base 65 toward the exterior of the ring 45. The base 65 and the bends 66 and 67 are a shape that complements that of the notches 37 formed in the nut 12. The fingers 38 of the sleeve 25 are therefore now in contact with the bends 66 and 67, the fingers 38 being shorter than the height of the bends.

The way in which the assembly works is the same as that described with reference to the first embodiment.

Of course, the invention is not restricted to the examples described hereinabove, and various modifications can be made to it without departing from the scope of the present invention.

The invention claimed is:

1. A chuck for equipping a rotary machine comprising a body intended to be fixed to a drive shaft of the machine, in which there are mounted several jaws which slide in bores converging forward and which each have an outwardly facing threaded part, a sleeve being pivotably mounted on the body and having an interior wall which collaborates with a nut, wherein the nut is engaged with the threaded exterior part of the jaws, wherein the body comprises, in its region covered by the nut, a peripheral set of teeth and the nut has a locking mechanism fixed thereon which is intended to engage in the set of teeth of the body when the chuck is in the tightened position, and wherein the interior wall of the sleeve is in contact with the locking mechanism such that the sleeve collaborates with the nut via the locking mechanism, and wherein the sleeve has an angular relative movement with respect to the locking mechanism between an unlocked position in which the sleeve turns the nut via the locking mechanism and a locked position in which the chuck is in its tightened position.

2. The chuck as claimed in claim 1, wherein the locking mechanism comprises at least one first spring leaf which is mounted angularly fixedly on the nut and which has a free end projecting through an opening made in the nut so that when the chuck is in the tightened position it reaches the set of teeth of the body.

3. The chuck as claimed in claim 2, wherein the locking mechanism comprises at least one second spring leaf which has a free end equipped with a relief which collaborates, in the unlocked and locked positions of the sleeve respectively, with a first depression and with a second depression which are formed in the sleeve.

4. The chuck as claimed in claim 3, wherein the first and second spring leaves are secured to a ring borne by the nut and prevented from rotating on this nut by means of at least two tabs which enter complementary parts formed in the nut.

5. The chuck as claimed in claim 2, wherein the sleeve comprises at least one hollowed-out part in which the free end of the first spring leaf is housed, when the sleeve is in the unlocked position, so as to disengage this free end from the set of teeth of the body.

6. The chuck as claimed in claim 2, wherein the sleeve comprises at least two fingers which collaborate with at least two notches formed on the nut, the notches being centered on the axis of the chuck and being longer than the fingers of the sleeve, this length being considered in the direction of the circular arc over which these notches extend.

7. The chuck as claimed in claim 6, wherein the difference in length between the notches of the nut and the fingers of the sleeve is tailored so that when the sleeve is in the unlocked position, the fingers are in abutment against one of the faces of the notches and the relief of the second spring leaf is in the first depression, and so that when the sleeve is in the locked position the fingers are in abutment against the other of the faces of the notches and the relief of the second spring leaf is in the second depression.

8. The chuck as claimed in claim 4, wherein the tabs of the ring extend radially and the complementary parts formed in the nut comprise at least two notches.

9. The chuck as claimed in claim 4, wherein the tabs of the ring each comprise a base extending transversely with respect to the plane of the ring and two bends which extend from the base and more or less toward the outside of the ring, the bases and the bends nesting elastically in the notches of the nut into which notches the fingers of the sleeve penetrate.

10. The chuck as claimed in claim 3, wherein the sleeve comprises at least one hollowed-out part in which the free end of the first spring leaf is housed, when the sleeve is in the unlocked position, so as to disengage this free end from the set of teeth of the body.

11. The chuck as claimed in claim 4, wherein the sleeve comprises at least one hollowed-out part in which the free end of the first spring leaf is housed, when the sleeve is in the unlocked position, so as to disengage this free end from the set of teeth of the body.

12. The chuck as claimed in claim 3, wherein the sleeve comprises at least two fingers which collaborate with at least two notches formed on the nut, the notches being centered on the axis of the chuck and being longer than the fingers of the sleeve, this length being considered in the direction of the circular arc over which these notches extend.

13. The chuck as claimed in claim 4, wherein the sleeve comprises at least two fingers which collaborate with at least two notches formed on the nut, the notches being centered on the axis of the chuck and being longer than the fingers of the sleeve, this length being considered in the direction of the circular arc over which these notches extend.

14. The chuck as claimed in claim 5, wherein the sleeve comprises at least two fingers which collaborate with at least two notches formed on the nut, the notches being centered on the axis of the chuck and being longer than the fingers of the sleeve, this length being considered in the direction of the circular arc over which these notches extend.

15. The chuck as claimed in claim 5, wherein tabs of the ring extend radially and the complementary parts formed in the nut comprise at least two notches.

16. The chuck as claimed in claim 6, wherein tabs of the ring extend radially and the complementary parts formed in the nut comprise at least two notches.

17. The chuck as claimed in claim 7, wherein tabs of the ring extend radially and the complementary parts formed in the nut comprise at least two notches.

18. The chuck as claimed in claim 5, wherein tabs of the ring each comprise a base extending transversely with respect to the plane of the ring and two bends which extend from the base and more or less toward the outside of the ring, the bases and the bends nesting elastically in the notches of the nut into which notches the fingers of the sleeve penetrate.

19. The chuck as claimed in claim 6, wherein tabs of the ring each comprise a base extending transversely with respect to the plane of the ring and two bends which extend from the base and more or less toward the outside of the ring, the bases and the bends nesting elastically in the notches of the nut into which notches the fingers of the sleeve penetrate.

20. The chuck as claimed in claim 7, wherein tabs of the ring each comprise a base extending transversely with respect to the plane of the ring and two bends which extend from the base and more or less toward the outside of the ring, the bases and the bends nesting elastically in the notches of the nut into which notches the fingers of the sleeve penetrate.

* * * * *